Aug. 14, 1951
K. R. WENDT
2,564,588
PHASE COMPARATOR FOR HORIZONTAL SWEEP DEFLECTION CIRCUIT
Filed Oct. 23, 1948
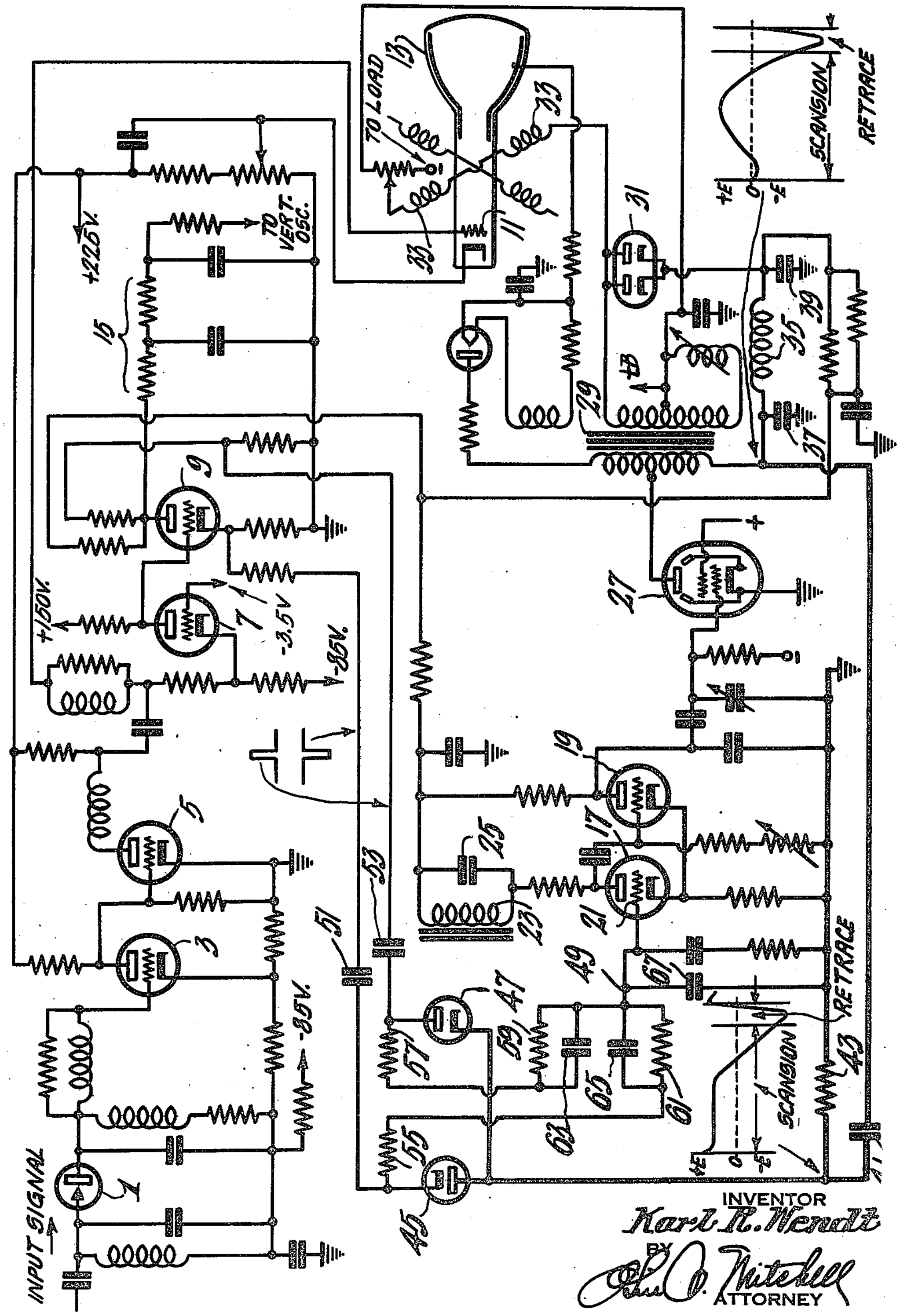
INVENTOR
Karl R. Wendt
BY [signature]
ATTORNEY Patented Aug. 14, 1951

2,564,588

UNITED STATES PATENT OFFICE 2,564,588

PHASE COMPARATOR FOR HORIZONTAL SWEEP DEFLECTION CIRCUIT

Karl R. Wendt, Eggertsville, N. Y., assignor to Radio Corporation of America, a corporation of Delaware Application October 23, 1948, Serial No. 56,245

6 Claims. (Cl. 178—7.5)

This invention relates to cathode ray beam deflection systems for television and the like, and more particularly to automatic frequency control for deflection signal generators.

It is well known in the television art that the transmission of visual information by electricity is characterized by the fact that a single electrical transmission circuit can carry but one information item at a time. Generally these items of information are conveyed by current pulses that are caused to flow through the transmission medium or circuit.

By analyzing the light detail of an image into its image elements and deriving therefrom a signal train of impulses by an orderly sequence of scanning, the image may be reproduced at a remote location by reconstruction of the image in the same orderly sequence of scanning. Since the scanning and the image repetition pulses are essentially artificial ones, the total number of scanning lines and the total number of image elements in each line, the sequence of transmission of the lines, the aspect ratio of the image, and the rate of image repetition may be chosen arbitrarily.

It is important, however, that the scanning at the receiving station correspond precisely to the scanning at the transmitting station.

Synchronism in scanning at the various locations is established by the transmission of synchronizing pulses generally included with the image detail information signal.

The operation of various synchronizing systems are quite well shown and described in the published art. For example, the early article "Television Synchronization" by E. W. Engstrom and R. S. Holmes in Electronics for November 1938 relates generally to the subject matter of synchronization.

Cathode ray beam deflection in the receiving station is controlled by a sawtooth wave generator. Normally the sawtooth wave generator is driven by an oscillator whose frequency of oscillation is controlled by the received synchronizing pulses. Circuit arrangements involving sawtooth wave generators excited by oscillators whose frequency is controlled by incoming signal pulses are also well known to the television art and are included in receivers which are presently on the market. A suitable description of some receivers involving such arrangements may be found in an article entitled "Television Receivers" published in the RCA Review for March 1947.

The subject of automatic frequency control of the oscillator frequency used in controlling the deflection signal generator is also quite well known and is referred to in an article entitled "Automatic Frequency and Phase Control of Synchronization in Television Receivers" by K. R. Wendt and G. L. Fredendall in the Proceedings of the Institute of Radio Engineers for January 1943.

In general, automatic frequency control systems operate to compare the locally generated wave with the incoming signal train of synchronizing impulses. Upon comparing the locally generated wave with the incoming synchronizing impulses a control potential may be developed which is employed to control the frequency of the local oscillator by controlling a reactance tube, by controlling grid bias of the oscillator or any other frequency control arrangement.

Heretofore various automatic frequency control arrangements have been proposed in television for developing by local oscillation a wave which is to be compared with the incoming synchronizing impulses. In this regard it must be emphasized that the lack of delay in automatic frequency control circuits is important since the automatic frequency control circuit consists of a feedback loop which will oscillate if insufficient damping is used. Even in such a circuit where oscillation will not occur because of the damping employed, the circuit will tend to swing about a mean value for a few cycles when it has been disturbed. The best means of avoiding oscillations of this sort is to reduce all time delays to a minimum.

According to this invention a circuit arrangement is proposed wherein delays are reduced to a minimum and thus stability is improved. Damping adjustments are also made very uncritical.

According to this invention a voltage is developed from the plate current of the horizontal output tube. This developed voltage is then severely differentiated to form a sawtooth wave which is then compared with the incoming synchronizing pulses.

In addition to the advantage gained by the reduction of delays, the severe differentiation prevents the passage of low frequency components which normally cause instability in the normal horizontal deflection. Furthermore, the impedance of the automatic frequency control circuit is so low that the automatic frequency detector cannot kick back a voltage to the source of the sawtooth voltage.

A primary object of this invention is to provide an improved television deflection system.

Another object of the invention is to provide for improved automatic frequency control of television deflection systems.

Still another object of this invention is to eliminate irregularities in deflection resulting from delay and feedback in the automatic frequency control circuit.

Other and incidental objects of the invention will be apparent to those skilled in the art from a reading of the following specification and an inspection of the accompanying drawing wherein the drawing shows by circuit diagram one form of this invention, wherein the heavy lines of the drawing refer more specifically to the details of the invention.

Turning in detail to the drawing there is indicated at the upper left hand corner means for capacitively coupling a received television signal including both an image signal component and synchronizing component to the input of a typical television receiver detector circuit. Such a composite signal may, of course, be obtained by employing any of the well known television receiver circuits such as, for example, like those shown and described in the article "Television Receivers" referred to above.

The input signal including both the image signal and synchronizing pulses are applied to a detector 1, which, for the purpose of illustration, is indicated as a rectifier. A direct current coupling is provided to its associated video amplifier involving tubes 3 and 5.

Detector circuits as well as video amplifiers, are also well known to the art and it is not intended here to set out in detail circuit components or theory of operation of detector circuits or video amplifiers. It is believed sufficient here to note that the composite signal including the image and synchronizing components are applied to tubes 7 and 9 which are included in a circuit arrangement commonly known as a "synchronizing signal separator."

Any suitable synchronizing signal separator may be employed in the practice of this invention.

Such as, for example, any of those shown and described in the article "Television Receivers" referred to above or a synchronizing signal separator such as shown and described in the U. S. Patent to A. V. Bedford No. 2,207,775, dated July 16, 1940.

The synchronizing signal separator illustrated in the drawing and involving tubes 7 and 9 is, however, a preferred form which is shown and described in detail in my copending U. S. application entitled "Synchronizing Signal Separator," Serial No. 56,246, filed October 23, 1948.

In accordance with the operation of synchronizing signal separators the video portion of the composite signal is fed to control electrode 11 of kinescope 13 while the vertical synchronizing pulses are separated from the horizontal pulses in circuit 15 in accordance with well known procedure to be applied to the vertical synchronizing signal oscillator not shown. In the explanation of the operation of this invention reference will be directed primarily to the horizontal deflection portion of the scanning.

The horizontal oscillator selected for the purpose of the explanation of the operation of this invention is of the multivibrator type involving tubes 17 and 19. Although any suitable oscillator circuit may be employed the particular form involving tubes 17 and 19 and shown in detail in the drawing is arranged to oscillate at a frequency dependent not only upon circuit constants but upon the bias potential applied to the control electrode 21 of tube 17.

Basically the multivibrator circuit involving tubes 17 and 19 is a two-stage resistance-coupled amplifier in which the output of the second tube 19 supplies the input of the first tube 17 with feedback energy to cause oscillation. An inductance 23 and condenser 25 are provided in the anode circuit of tube 17. A more detailed explanation of the operation of multivibrator circuits may be found in any of the radio textbooks, such as for example, the Radio Engineering Handbook by F. E. Terman, First Edition.

The output signal of the oscillator involving tubes 17 and 19 is applied to the control electrode of the deflection power output tube 27.

The power output tube 27 produces in a transformer 29 a current which in combination with the dual diode tube 31, known as the damper tube, produces a constant voltage across horizontal deflection coils 33 to produce in turn the linear deflection required for kinescope 13.

Generally the deflection circuits of the type shown and employing the so-called damper tube 31, cause a current to flow through the damper tube 31 during scansion as a result of the energy stored in the circuit inductance during the retrace periods of the cathode ray scanning cycle. This current theoretically may be combined with the current output of the power tube to a summation characteristic which is linear with respect to time.

It has been found that the non-linearity of scanning is due to a dropping off of deflection coil current and the voltage may be compensated by controlling the flow of current through the damper tube 31 and that as a result of such control theh voltage across the beam deflection coils 33 during scansion may be maintained relatively constant. A preferred arrangement for accomplishing this linearity control is shown in the drawing and includes an inductance 35 and condensers 37 and 39. The operation of the circuit involving inductance 35 and condensers 37 and 39 with respect to its control of linearity is discussed at some length in the U. S. Patent to S. I. Tourshou No. 2,440,418, dated April 27, 1948.

As a result of the current drawn by tube 27 in its anode circuit through the primary of transformer 29, there is a recurrent parabola voltage wave occurring across condenser 37.

According to this invention this recurring parabola voltage wave is utilized in the automatic frequency control circuit. This voltage is of such low impedance and magnitude that it may be severely differentiated in the circuit involving condenser 41 and resistor 43 to form a sawtooth voltage as indicated. A suitable sawtooth voltage is obtained even when resistor 43 has as low a value as 330 ohms.

This sawtooth voltage obtained from the differentiator involving condenser 41 and resistor 43 is applied to a clamping circuit involving diode 45 and diode 47.

Although one form of clamping circuit is illustrated any suitable arrangement may be employed to establish proper bias level at point 49 which is dependent upon the relative phase of the sawtooth wave, and of the incoming synchronizing pulses.

Various clamp circuits are shown and described in detail in the published art such as, for example, in my paper entitled "Television D. C. Component" published in the RCA Review for March, 1948.

A clamping circuit of the type illustrated as applied to direct current reinsertion in television systems is shown and described in my U. S. Patent No. 2,299,945, dated October 27, 1942.

The clamp circuit shown consists of the two diodes 45 and 47 driven by push-pull pulses from the anode and cathode circuit of tube 9. The two diodes 45 and 47 are driven through two condensers 51 and 53 and are connected by two resistors 55 and 57 through appropriate filter circuits involving resistors 59 and 61 and condensers 63 and 65. The time constant of the condenser 51 and resistor 55 circuit as well as the time constant of condenser 53 and resistor 57 circuit is long compared to the pulse time.

The exact voltage to which condenser 67 is charged or to which point 49 is brought during the pulse time, depends upon the voltage across resistor 43 at pulse time. This will be understood when it is appreciated that the diodes 45 and 47 are biased such that their cathodes are positive with respect to their associated anodes during all the time except during a synchronizing pulse when the cathode of diode 45 is driven in a negative direction to the potential of the anode of diode 45 and the anode of diode 47 is driven positive to the potential of its associated cathode.

It therefore follows that the potential at point 49 is dependent upon the relative phase of the sawtooth voltage across resistor 43 and the incoming synchronizing pulses. A more detailed description of this clamp circuit action may be had through reference to United States patent 2,358,545 to Karl R. Wendt, entitled "Television System," issued September 19, 1944. The frequency of the multivibrator involving tubes 17 and 19 is thereby controlled in accordance with the relative phase of the generated sawtooth voltage with respect to the applied synchronizing pulses. If, for example, the speed of the oscillator involving tubes 17 and 19 increases, the relative phase between the sawtooth voltage and the synchronizing pulses will change to cause the oscillator to slow down in frequency.

Although the operation of this invention has been directed primarily to horizontal deflection synchronization, it is not intended that the invention be sufficiently limited thereto but may be employed in any arrangement wherein accurate frequency control is necessary.

Having thus described the invention, what is claimed is:

1. In a television system of the type in which a deflection power output tube is driven by an oscillator which is frequency responsive to a bias potential to deliver cyclically varying current to beam deflection means, a frequency control for said oscillator comprising a source of synchronizing pulses, a source of anode potential for said power output tube, means connected in the circuit between said power output tube and said source of anode potential for developing a recurring parabolic voltage wave under the influence of the current drawn by said output tube, means for differentiating said parabolic voltage to form recurring sawtooth voltage waves, means for comparing said recurring sawtooth voltage wave with said synchronizing pulses to develop a bias potential dependent upon the relative phase of the sawtooth waves and the synchronizing pulses, and a circuit connection between said last mentioned means and said oscillator for applying said bias potential to said oscillator.

2. In a television receiving system of the type in which a deflection power output tube is driven by an oscillator which is frequency responsive to a bias potential to deliver cyclically varying current to beam deflection means, a frequency control for said oscillator comprising in combination a synchronizing signal separator for said system, a source of anode potential for said power output tube, a serially connected impedance followed by a parallel connected capacity connected in the circuit between said power output tube and said source of anode potential for developing a recurring parabolic voltage wave under the influence of the current drawn by said output tube, means for differentiating said parabolic voltage to form recurring sawtooth voltage waves, means for comparing said recurring sawtooth voltage wave with said synchronizing pulses to develop a bias potential dependent upon the relative phase of the sawtooth waves and the synchronizing pulses, and a circuit connection between said last mentioned means and said oscillator for applying said bias potential to said oscillator.

3. In a television system of the type in which a deflection power output tube is driven by an oscillator which is frequency responsive to a bias potential to deliver cyclically varying current to beam deflection means, a frequency control for said oscillator comprising a synchronizing signal separator, a terminal adapted to receive anode potential for said output tube, means connected in the circuit between said power output tube and said terminal for developing a recurring parabolic voltage wave under the influence of the current drawn by said output tube, an electrical differentiating circuit connected to said means for developing a recurring parabolic voltage, means connected to said synchronizing signal separator and said differentiating circuit for comparing said recurring sawtooth voltage wave with said synchronizing pulses to develop a bias potential dependent upon the relative phase of the sawtooth waves and the synchronizing pulses, and a circuit connection between said last mentioned means and said oscillator for applying said bias potential to said oscillator.

4. In a television system of the type in which a deflection power output tube is driven by an oscillator which is frequency responsive to a bias potential to deliver cyclically varying current to beam deflection means, a frequency control for said oscillator comprising a synchronizing signal separator for said system, a terminal adapted to receive anode potential for said output tube, a serially connected inductance and a condenser for developing a recurring parabolic voltage wave under the influence of the current drawn by said output tube, means for differentiating said parabolic voltage to form recurring sawtooth voltage waves, means for comparing said recurring sawtooth voltage wave with said synchronizing pulses to develop a bias potential dependent upon the relative phase of the sawtooth waves and the synchronizing pulses, and a circuit connection between said last mentioned means and said oscillator for applying said bias potential to said oscillator.

5. In a television system of the type in which a deflection power output tube is driven by an oscillator which is frequency responsive to a bias potential to deliver cyclically varying current to beam deflection means, a frequency control for said oscillator comprising a source of synchronizing pulses, a clamping circuit for said synchronizing pulses, a source of anode potential for said power output tube, an inductance and a condenser connected in the circuit between said power output tube and said source of anode potential, an electrical differentiating circuit connected to said inductance and condenser, a connection between said signal clamping circuit and said source of synchronizing pulses, a filter circuit connected to said clamping circuit and a bias connection between said oscillator and said filter circuit.

6. In a television system in which a deflection power output tube is adapted to deliver cyclically varying current through a coupling transformer to the electromagnetic beam deflection means associated with a cathode ray tube wherein an electron beam is developed and then deflected by the passage of said current through said deflection means so as to scan a target area, and in which means including a diode are provided in shunt with said coupling transformer for damping out oscillations which would normally be produced during a portion of each current cycle in part by the inductance of said coupling transformer and said deflection means, an automatic frequency control comprising in combination a source of synchronizing pulses, a source of anode potential for said power output tube, means connected between said coupling transformer and said source of anode potential for developing a recurring parabolic voltage wave under the influence of the current drawn by said output tube, means for differentiating said parabolic voltage to form recurring sawtooth voltage waves, means for comparing said recurring sawtooth voltage wave with said synchronizing pulses to develop a bias potential dependent upon the relative phase of the sawtooth waves and the synchronizing pulses, means for controlling the frequency of operation of said power output tube and a circuit connection between said means for comparing said recurring sawtooth voltage wave with said synchronizing pulses and said means for controlling the frequency of operation of said power output tube.

KARL R. WENDT.

REFERENCES CITED

The following references are of record in the file of this patent:

UNITED STATES PATENTS

| Number | Name | Date |
|---|---|---|
| 2,332,681 | Wendt | Oct. 26, 1943 |
| 2,344,810 | Fredendall et al. | Mar. 21, 1944 |
| 2,358,545 | Wendt | Sept. 19, 1944 |
| 2,450,156 | Fredendall | Jan. 4, 1949 |

OTHER REFERENCES

Pcdgs. I. R. E. vol. 31, #1, January 1943, page 9.